(12) United States Patent
Muirhead et al.

(10) Patent No.: US 6,340,194 B1
(45) Date of Patent: Jan. 22, 2002

(54) HARD TRUCK BED COVER

(75) Inventors: Scott A. W. Muirhead, Uniontown; Kent E. Buckingham, Washington, both of PA (US)

(73) Assignee: STK, LLC, Uniontown, PA (US)

(*) Notice: Subject to any disclaimer, the term of this patent is extended or adjusted under 35 U.S.C. 154(b) by 0 days.

(21) Appl. No.: 09/571,043

(22) Filed: May 15, 2000

Related U.S. Application Data

(60) Provisional application No. 60/140,741, filed on Jun. 25, 1999.

(51) Int. Cl.⁷ .................................................. B60P 7/02
(52) U.S. Cl. ............................. 296/100.06; 296/100.02; 296/100.07; 296/100.1; 296/191; 296/100.01
(58) Field of Search ....................... 296/100.01, 100.02, 296/100.06, 100.07, 100.08, 100.1, 100.03, 100.04, 100.05, 191

(56) References Cited

U.S. PATENT DOCUMENTS

| | | | |
|---|---|---|---|
| 3,762,762 A | * 10/1973 | Beveridge et al. | 296/137 B |
| 3,785,698 A | * 1/1974 | Dean et al. | 296/137 |
| 4,079,989 A | 3/1978 | Robertson | |
| 4,124,247 A | 11/1978 | Penner | |
| 4,324,429 A | 4/1982 | Wilson et al. | |
| 4,762,360 A | 8/1988 | Huber | |
| 4,773,126 A | 9/1988 | Voss | |
| 4,832,394 A | 5/1989 | Macomber | |
| 4,941,705 A | 7/1990 | Wurtz | |
| 5,018,777 A | 5/1991 | Swenson et al. | |
| 5,186,517 A | 2/1993 | Ronai | |
| 5,228,736 A | 7/1993 | Dutton | |
| 5,322,336 A | 6/1994 | Isler | |
| 5,385,377 A | 1/1995 | Girard | |
| 5,503,450 A | 4/1996 | Miller | |
| 5,540,475 A | 7/1996 | Keasting et al. | |
| 5,553,652 A | 9/1996 | Rushford | |
| 5,631,522 A | 5/1997 | Gaitan et al. | |
| 5,655,808 A | 8/1997 | Wheatley | |
| 5,688,017 A | 11/1997 | Bennett | |
| 5,743,586 A | * 4/1998 | Nett | 296/100 |
| 5,860,691 A | 1/1999 | Thomsen et al. | |
| 5,904,393 A | 5/1999 | Yoder | |
| 6,042,173 A | * 3/2000 | Nett | 296/100.06 |
| 6,109,681 A | * 8/2000 | Edwards et al. | 296/100.02 |

* cited by examiner

*Primary Examiner*—Joseph D. Pape
*Assistant Examiner*—Lori L Coletta
(74) *Attorney, Agent, or Firm*—Harness, Dickey & Pierce, P.L.C.

(57) ABSTRACT

A hard cover for the open bed of a pickup truck is thermoformed from two sheets of heat deformable plastic material. The top sheet has a slightly crowned surface and four depending walls defining a perimeter lip corresponding to the top ledge of a pickup truck bed. The bottom sheet reinforces the top sheet and is itself slightly crowned and includes four walls. The bottom sheet includes prop support members which depend below the margin defined by the perimeter lip of the hard cover. The perimeter lip of the hard cover may be adapted to reside within a range of similarity sized pickup truck bed rail margins, so that one hard cover can be utilized on several truck models. The hard cover may also be associated with a molded platform that overlays and closely conforms to the bed rails of a truck bed to provide a protective truck bed cover assembly. The molded platform is provided with a channel to receive the lip of the hard cover to provide a seal. The hard cover is releasably attached to the molded platform, and the molded platform itself is adapted for direct installation to the truck bed. The molded platform is an intermediate interface between the hard cover and the truck bed. The molded platform protects the truck bed rail against damage when the present hard cover is supported upn the truck bed.

36 Claims, 9 Drawing Sheets

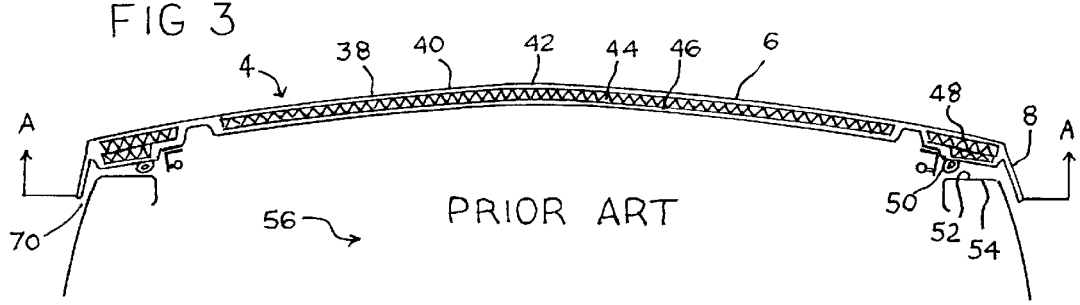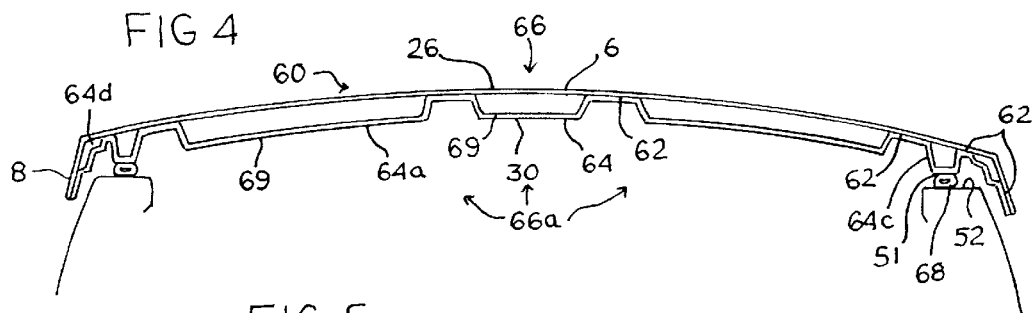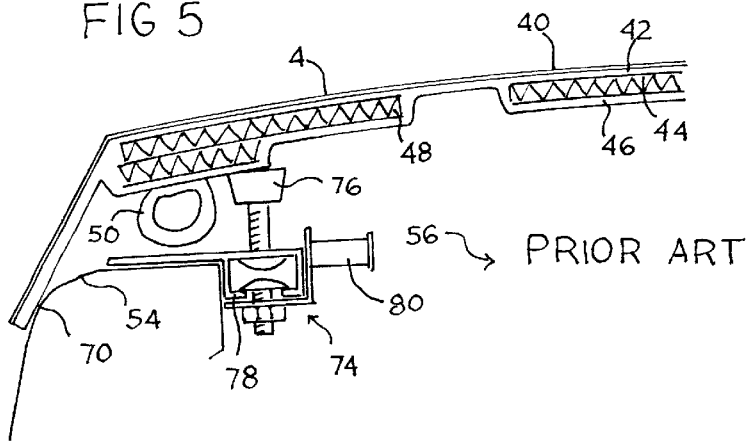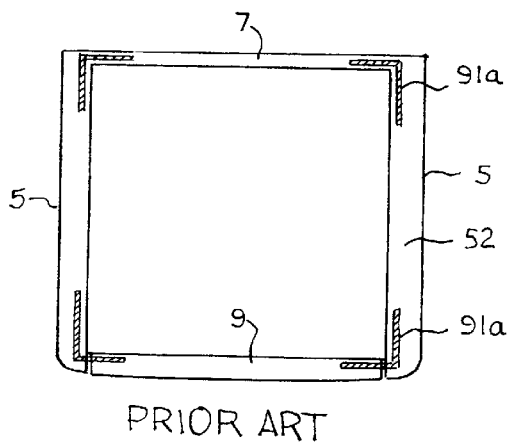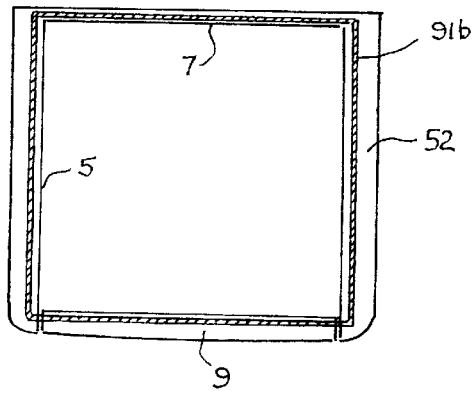

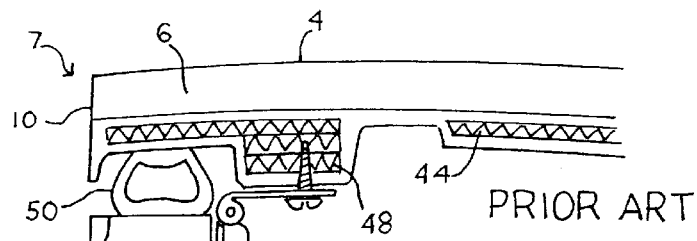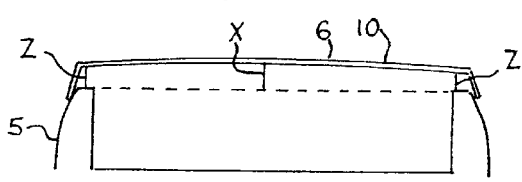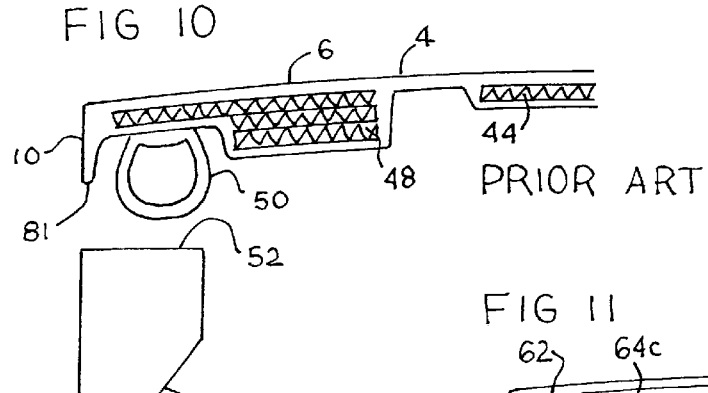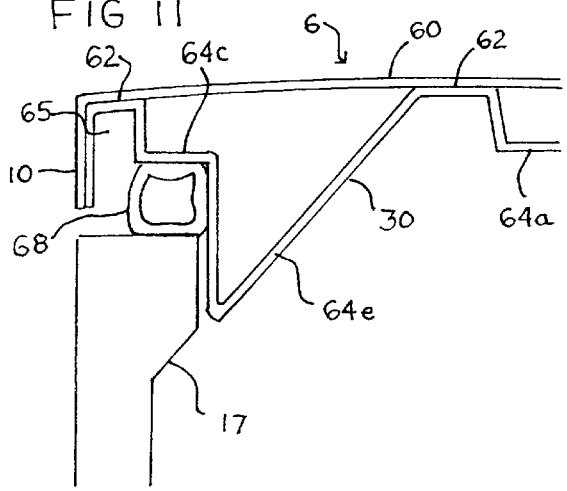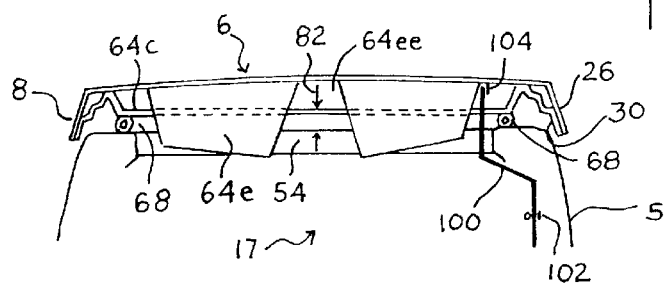

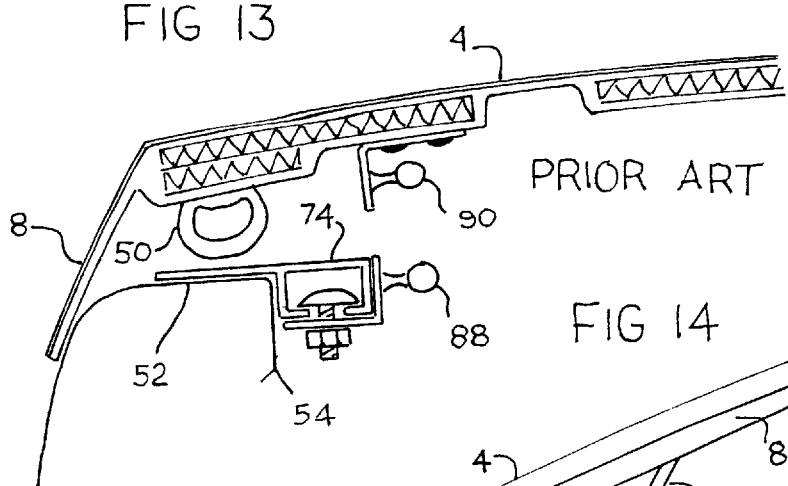
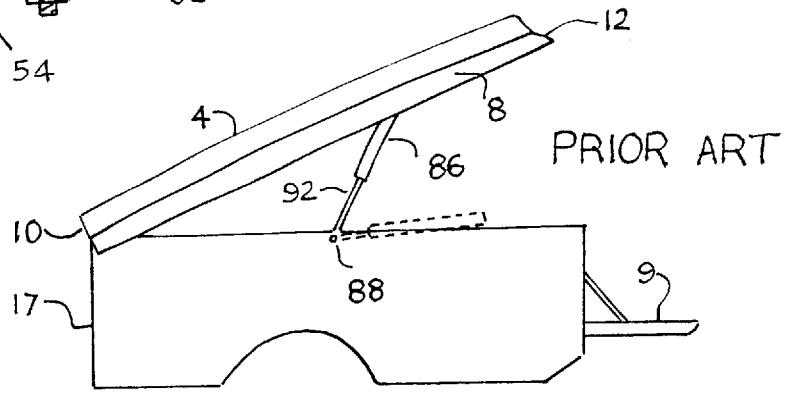
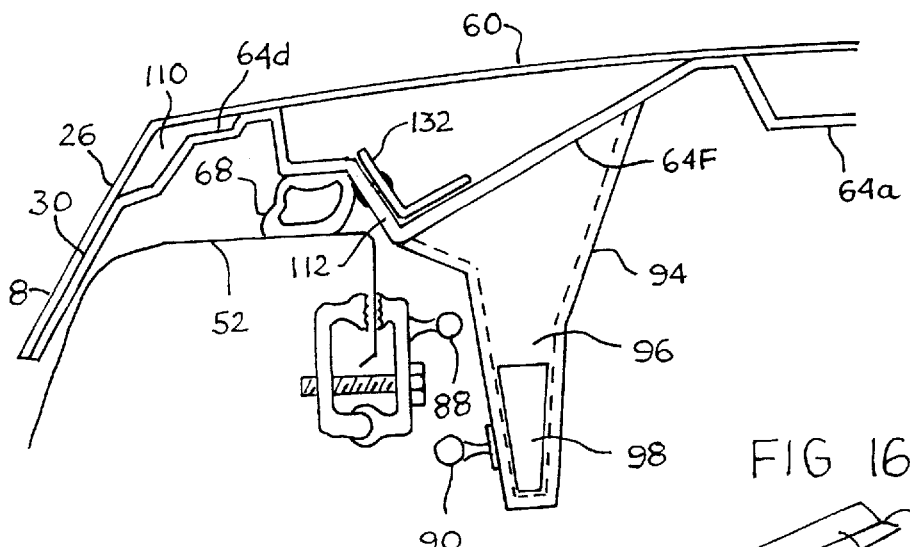
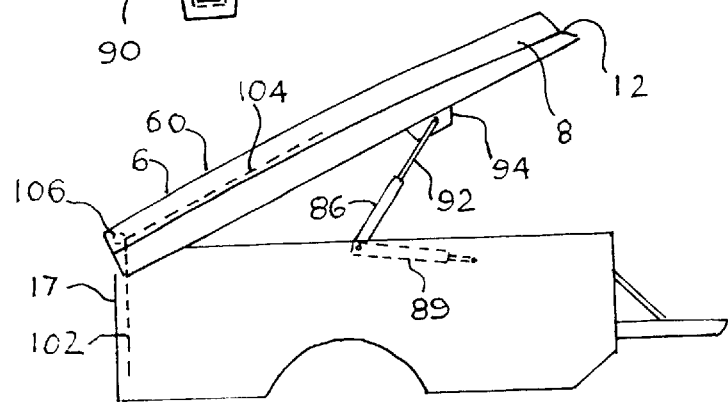

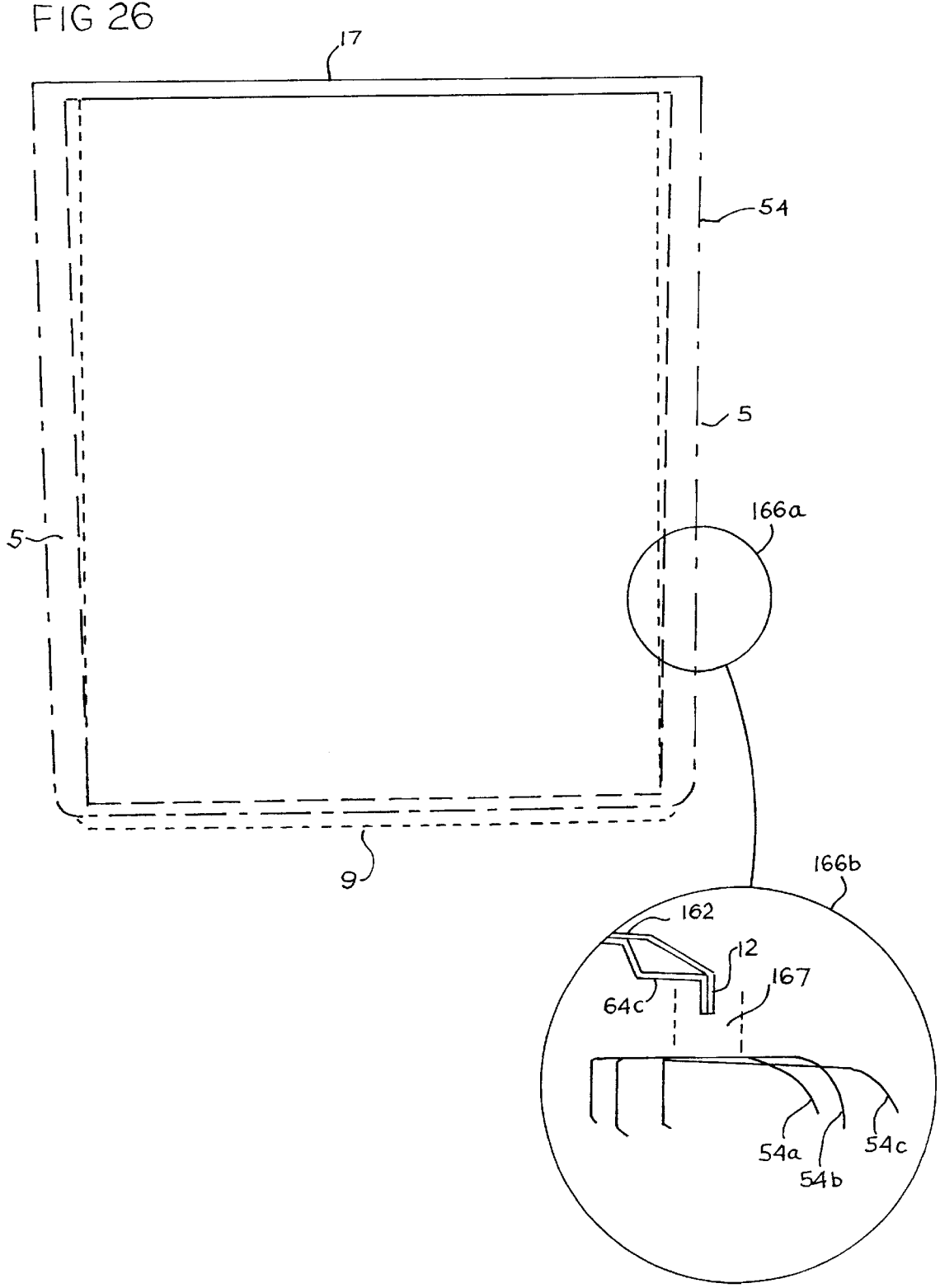

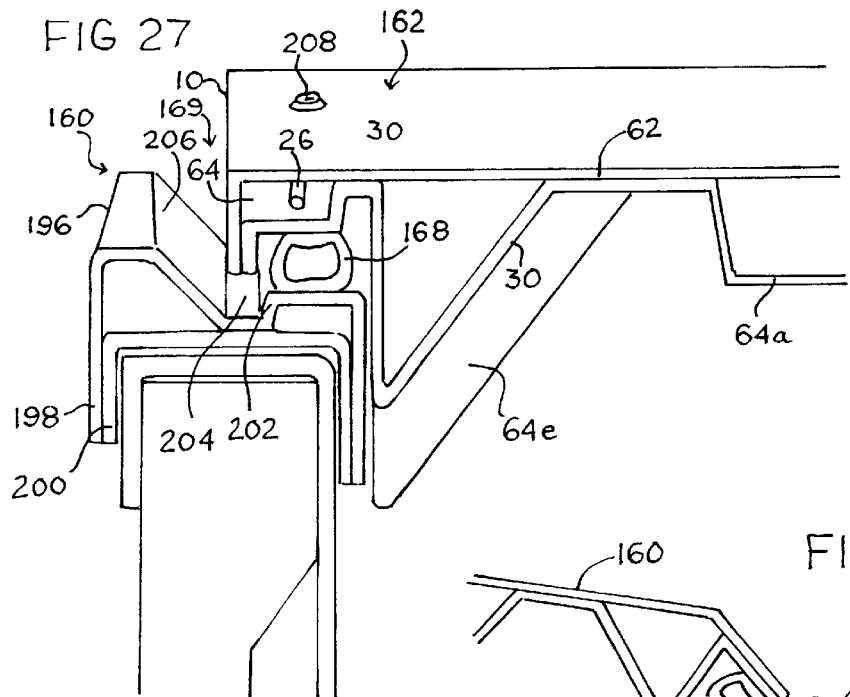
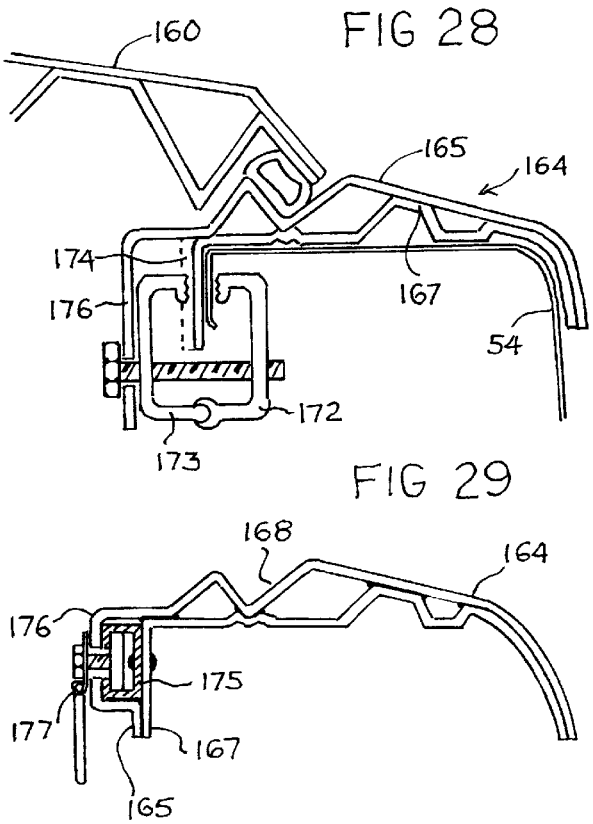
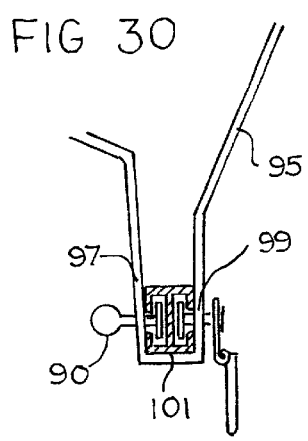
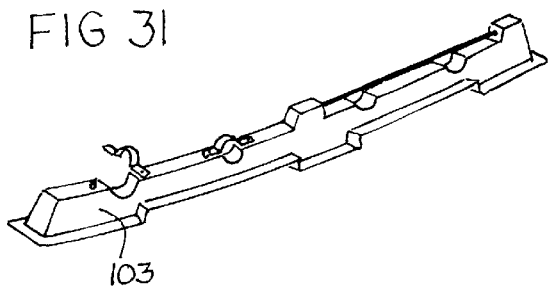

HARD TRUCK BED COVER

CROSS-REFERENCE TO RELATED APPLICATIONS

This application claims benefit to U.S. Provisional Ser. No. 60/140,741 dated Jun. 25, 1999.

FIELD OF THE INVENTION

This invention is generally directed toward a top for a land vehicle. More particularly, this invention is directed to a rigid cover for a pickup truck cargo bed. The present cover is composed of a first thermoformed sheet of plastic that provides a desirable application surface, and a second thermoformed sheet of plastic comprising molded-in details imparting strength, encapsulating hardware and other functional elements that advance the art of tops for land vehicles.

In the present embodiments, the first and second thermoformed sheets are permanently bonded together to produce a one-piece cover. Also included are one or more hinge elements operable to connect the cover to the truck bed about front wall; one or more props which support the cover in the opened position; and, a lock mechanism to secure the cover in the closed position.

DESCRIPTION OF THE PRIOR ART

Pickup truck vehicles are used for both work-related activities and personal transportation. The pickup truck bed provides carrying space for both work-related and personal cargo. In order to prevent cargo from being damaged by weather or stolen, it has become common to install a protective cover over the truck bed. There are four types of cover commonly available for this purpose. The most popular type of cover is referred to by industry as a "topper" or a "truck cap". A topper is characterized as having two opposed vertical side walls, a front wall and a back wall, which walls extend upward from the truck bed rails to form a roof with an over-all height generally equal to the top of passenger cabin of the pickup truck vehicle. The opposed sidewalls generally include windows for visibility, and the back wall includes a rear window lift gate for access. The three other types of covers for a truck bed are generically referred to as tonneau covers. The three types of tonneau cover comprise one-piece rigid covers; multi-piece sectional and roll-up covers; and, soft covers composed of a flexible vinyl fabric supported by cross-bows and optionally, a perimeter fabricated metal frame. The present invention falls under the category of one-piece rigid covers.

There are several prior art devises that disclose one-piece rigid tonneau covers. These prior art devises in turn include fiberglass reinforced plastic (FRP) covers; composite thermoset plastic covers and fabricated metal and/or plastic panel covers. By a considerable margin, the most popular and widely sold one-piece rigid covers are the FRP cover variety.

FRP cover products are produced by conventional lay-up operations are uneconomical compared to the modern technology of thermoform manufacturing operations.

The lay-up operation is time-consuming and labor intensive. The lay-up process involves the application of parting agents, a gel coat surface and two or more lamination steps that often include inserts for reinforcement. Each step is labor intensive and requires cure times that are influenced by temperature, humidity and other technical and labor factors. A single FRP tonneau cover mold is capable of producing 3–5 parts in a 24-hour period. Current thermoforming art is capable of converting sheets of plastic into rigid one-piece twin-sheet covers at a rate of 12 plus parts per hour. Thermoforming is a significantly more productive processing technology.

The lay-up operation uses polyester resins and fiberglass. The application surface of the lay-up process comprises specialty gel-coat resins that normally cost double the price of the polyester resins. An FRP cover for a small size pickup truck bed weighs approximately 95 lbs. The weight of the center of an FRP cover is so heavy that it collapses in upon itself when unsupported. Therefore, contemporary FRP covers also included filled resins and/or load-bearing inserts comprising wooden or aluminum cross members, foam panels or paperboard honeycomb panels that become saturated with resin between two laminations of FRP. A twin-sheet thermoformed plastic cover, for the equivalent make and model of pickup truck bed weighs 60 lbs. The resin costs for thermoformable plastics range in price, with HDPE at the low end and ABS at the high end. The material cost factor between FRP and thermoformable resins is in the order of 2 to 1. Thermoforming is therefore a much more economical processing technology.

The lay-up operation produces styrene monomer vapors that produce worker safety and environmental problems. The lay-up operation also poses cleanup and storage problems. The lay-up operation is taxed by many states to dis-incentivise its use and to re-cover its impact costs upon society. The thermoforming process of converting HDPE or ABS plastic resins into finish products carries little, if any risk, to society. Unlike thermosetting FRP resins, HDPE and ABS are 100% recyclable. Thermoforming is therefore a safer and cleaner processing technology.

The FRP lay-up operation has retained its prevalent position within the market because the manufacturers of tonneau covers also manufacture FRP toppers. The larger topper market, in terms of manufacturers' sales revenue, has therefore precluded the move toward more promising thermoforming technologies. In summary, the existing manufacturers operate within a competitive market and are therefore reluctant to switch to more modern operations and technologies.

In addition to being uneconomical and having negative worker safety and environmental impacts, FRP covers are also not user friendly. The heavy weight construction of a FRP cover poses several problems. The FRP cover can not be easily removed from the truck bed because it of its heavy weight. A heavy weight FRP cover also increases fuel consumption and the cost of operating the vehicle. The heavy weight of an FRP cover can also damage the pickup truck box. For example, the unforgiving structure of a heavy weight burden upon the front and sidewall rails of a pickup truck can result in sheet metal deformation and warping. Furthermore, the heavy weight of the cover acts to compress and abrade the gasket materials that provide a water-resistant seal between the cover and the truck bed, which over time results in wear and tear to the paint finish of the pickup truck bed rails. These effects reduce the resale value of the pickup truck vehicle. The inside surface of the FRP cover is usually unfinished and exposes the hand-rolled FRP materials. Cover manufacturers add a secondary painted surface finish or apply a non-woven fabric to hide the rough inside FRP surfaces at extra cost in order to over-come this appearance problem. Finally, in order to adapt the crowned application surface of the FRP cover to the flat rail surfaces of the truck bed, the FRP cover manufacturers use added inserts. This arrangement is typically ineffective because the additional inserts do not adequately compensate for the front-to-back crown along the sidewalls or the side-to-side crowns about the rear and front walls of the FRP cover. Water penetration occurs when a proper seal is not achieved, and water can damage cargo stored in the truck bed.

An advanced thermoformed cover substantially overcomes these problems. A thermoformed cover is approximately 35% lighter than an equivalent sized FRP cover, and is easier to remove and re-install at the convenience of the vehicle operator. A lighter weight thermoformed cover decreases long-term fuel consumption and therefore the cost of operating the vehicle. Elements of the second inside sheet of a thermoformed cover can be adapted to conform to the horizontal plane defined by the truck bed rails upon which the cover rests. Therefore, while the first sheet can be crowned to present an attractive appearance and overcome the FRP cover problem of "dishing", the second sheet can be adapted to provide a uniform compression seal about the truck bed rails which minimizes damage to the painted surfaces. A lighter weight thermoformed cover also produces less deflective forces about the prop mounting points and hinge mechanisms, which in turn reduces the incidence of sheet metal deformation and warping. The inside molded appearance of the thermoformed cover is superior to the rough inside surface appearance of the FRP cover.

Another consideration is that roughly 90% of all FRP covers are custom painted to match the color scheme of the pickup truck vehicle. A problem with painted FRP covers is that painting grade gel coat resins have low impact strength, and where the FRP cover edges are exposed and impacted, the painted gel coat chips off the application of FRP paint systems usually includes the use of sensitive activators, agents and solvents that cause worker safety and environmental problems.

Another consideration is that FRP covers are difficult to align and install because they are typically poorly executed in design and difficult to handle because of their heavy weight. For example, FRP covers occupy a position above the truck bed rails. The FRP cover includes a foam gasket about its outside margin coexistent with the top of the truck bed rails. This gasket is meant to compress against the rail of the truck bed to prevent water penetration. FRP covers are crowned to reduce the appearance problem of "dishing" at the center. The crown along the front bed wall increases to the middle. If an insert that compensates for this crown in not interposed between the FRP cover crown and the top of the front bed rail, the cover will only restrict water penetration. The FRP cover manufacturers will use an additional combination of strips of the insert material used to reinforce the crown, but this is ineffective because the strips are uniform in thickness and are not crowned themselves. The second sheet of the thermoformed cover can be molded to provide a consistent distance between the inside surfaces of the cover and the outside painted surfaces of the truck bed rails. This arrangement allows the compression points of the thermoformed cover to be evenly distributed and aligned for installation, rather than focused at the crown low points and mal-aligned to the four corners in the case of FRP covers.

Another consideration is that when an FRP cover is installed, the FRP cover is usually lifted up by one person standing on the tailgate, and is attached to front wall and the sidewalls by a second or third person. The crown of the FRP cover does not catch on the front wall to prevent the heavy cover from shifting forward against the passenger cabin upon lifting. When the hardware is affixed at a bind, the cover warps or the sheet metal deforms. Elements of the FRP cover do not characteristically protrude below the horizontal plane defined by the top surfaces of the truck bed rails.

A characteristic of FRP covers is that the pneumatic props are mounted to the side rail and the cover. This arrangement produces a constant opening force upon the cover when the cover is closed, and in case of heavy-duty FRP covers produces significant focussed prop pressure points. These can deform the sheet metal structures of the truck bed rail when the cover is closed under stress as well as deflect the FRP crown over time.

Another consideration is that cover consumers no longer accept vehicle damage, because pickup truck vehicles are becoming increasingly expensive to purchase and operate. FRP cover manufacturers have begun to use fabricated aluminum frames to retain the cover in a position above the truck bed rails. The aluminum rails offer a no-drill installation as well as means for deflecting hinging, prop and cover weight stress upon the painted metal surfaces of the pickup truck vehicle. U.S. Pat. No. 5,688,017 to Bennett is representative of the frame systems used by FRP cover manufacturers. The added economic cost, increased weight and installation difficulties associated with hard cover frame systems is the FRP cover industry's attempt to correct the damaging effects of FRP cover use Another problem is that there are an increasingly large number of pickup truck types and body styles. An FRP manufacturer must develop a unique lay-up mold in order to produce a cover model for each truck bed size and body style. The consequences of this requirement are varied. When coupled with the paint factor noted above, it can take up to two weeks before a color matched cover can be delivered and installed on the pickup truck for the vehicle owner. The inventory cost to maintain a virtually unlimited selection of color-matched covers in a wide range of truck bed types and body styles is prohibitive. Therefore the cover consumer must be prepared to wait for the manufacturer to produce, paint and deliver an FRP cover to the dealer before the product can be installed onto the vehicle. The FRP cover purchasing process is time-consuming and is not suitable for fulfilling a consumer's need for immediate gratification. This consequence, plus the high cost of an FRP cover, are the principle factors which have contributed to the increasing popularity of standard black soft covers among pickup truck owners. Accordingly, a need exists for a small number of hard covers that can be adapted to fit a wide variety of truck bed types in the conventional body style sizes. These body style sizes include full-size long and short beds, compact-size long and short beds, intermediate-size long and short beds and full and compact-size sport and flare-side beds. A hard cover of this description would reduce the inventory requirements within the distribution system, and compress the lead-time for delivery. This type of hard cover would also provide a more robust and tamper proof product than a soft cover which can be slashed open with a knife by vandals and thieves.

Another problem with conventional FRP covers is that they use opposed pneumatic props to support the cover in an open position. The disadvantage of this arrangement is that access to the cargo area of the pickup truck bed is restricted from the sides by the props.

SUMMARY OF THE INVENTIONS

It is a primary objective of the present invention to provide a rigid cover for a pickup truck bed in order to protect cargo and property against weather and from vandalism.

Another objective is to provide a cover comprised of two sheets of thermoformed plastic, which offers several economic advantages. Thermoforming offers clear production volume advantages, which will permit the more advanced product to be distributed into a wider market territory. Thermoforming is lower cost and will allow the consumer to benefit through lower pricing. Thermoforming poses less risk to worker safety because the process does not release harmful emissions and violates. Thermoforming materials are sensitive to the environment and are 100% recyclable.

Another objective is provide a cover that offers several consumer friendly benefits. A lighter weight thermoformed cover is more user friendly allowing the vehicle operator to install and remove the cover with greater ease. A lighter weight cover consumes less fuel to reduce vehicle-operating costs over time.

Another objective is to use a processing technology and materials that are safer for the environment and have less worker safety issues.

Another objective is to produce a cover with a full perimeter watertight seal to prevent cargo damage and paint abrasion.

Another objective is to encapsulate the cover hardware between the two sheets of the cover to provide a more attractive appearance and finish.

Another objective is to add front retaining wall to the inside sheet of molded plastic to aid in the installation and removal of the cover from the truck bed. A feature that can be added includes an alignment guide for installation.

Another objective orientates the cover lifting springs to produce a constant closing force, which reduces deflection of the cover and compensates for elevated temperature conditions that may cause the cover to deflect.

Another objective adapts the cover to use coil springs operable from the front of the cover in substitution of opposed pneumatic props that restrict access to the truck bed from the sides. The objective provides springs, which do not interfere with the installation of other truck bed accessories.

Another objective adds load bearing and shape retaining strength to the second inside sheet of thermoformed plastic with the addition of molded in reinforcing elements. The individual reinforcing elements may themselves include stress reducing features comprising notches and interconnecting bridges, and are preferably arranged in patterns that impart additional front-to-back and side-to-side cover crown strength while deflecting localized hinging and focussed pressure stress points.

Another objective increases strength to the cover where the cover's crowned top surface transitions into the down-turned cover walls that define a perimeter lip. A hollow area along the linearly extending transition is provided between the two sheets forming the cover to increase load-bearing strength.

Another objective inserts load-bearing and cover shape retaining members between the two sheets comprising the cover, which members enable the cover to be constructed in thinner gauge sheets that improve strength-to-weight and cost/price ratios.

It is still yet another set of objectives to produce a cover that is adaptable to a wide range of truck beds within certain truck bed size categories.

Additional objectives therefore include providing a cover assembly product line comprising a small number of covers in common sizes, and a large number of rail adapter kits that are specific to each make and model of truck bed in the common sizes. The cover component of the assembly incorporates the cover features listed above in connection with the improvements over conventional FRP style thermo-formed covers. The rail components themselves include other features.

Another objective is provide a four part rail kit, comprising one front wall and two side wall components operable to engage the truck bed rail and a rear wall component operable to engage the rear wall of the cover component. This arrangement produces a full perimeter boarder appearance and operates to restrict the tailgate from being opened without first opening the cover. The tailgate is maintained in the dosed position under lock and key by the cover to prevent theft and vandalism. In alternate arrangements, the rear wall component of the rail kit is operable for mounting upon the tailgate, but this arrangement is not always preferred because tailgates are not amenable for clamps or no-drill installation.

Another objective is provide front and side wall rail components with a channel to receive the down-turned walls of the common sized cover. The position of the channels on the truck bed adapting rail components is pre-determined by the relative position of the perimeter margin of the cover component. The channel includes draining features and may be reinforced to add strength to rail components and prevent paint abrasion of the truck bed.

The rails include details that are further operable to enclose clamps that attach the rail components to the truck bed rails for appearance purposes and a no-drill installation. The front rail channel includes an angled portion designed to receive the pivoting front wall of the cover. The rail components may be constructed out of a single sheet or a plurality of sheets molded and bonded together for hardware supporting and cover bearing strength.

Briefly, in accordance with this invention, there is provided a twin-sheet cover for installation onto the bed rails of a pickup truck. The cover, including hardware may be operable with the truck bed alone, or in cooperation with rail adapting kits.

Other objects and advantages of the present embodiments will become apparent from the following descriptions and appended claims when taken in conjunction with the accompanying drawings.

DESCRIPTION OF THE DRAWINGS

FIG. 3 is a cross section of the prior art taken along line A—A of FIG. 1.

FIG. 4 is a cross section of the one embodiment of the present invention taken along line B—B of FIG. 2.

FIG. 5 is an exploded sectional view of the sidewall region of the prior art.

FIG. 6 is a plan view of the footprint of communication between the prior art and a truck bed.

FIG. 7 is a plan view of the footprint of communication between the present invention and a truck bed.

FIG. 8 is a section showing the front wall of the prior art.

FIG. 9 is an elevational view the front wall of FIG. 8.

FIG. 10 is a section view showing the prior art at the center location shown in FIG. 9.

FIG. 11 is a section showing the present art along the front wall.

FIG. 12 is a side elevation view of the present invention in front of the front truck bed wall.

FIG. 13 is an exploded view of the prior art supporting means for spring props.

FIG. 14 is a side elevation view suggesting the open and close forces associated with the props.

FIG. 15 is an exploded view of the present invention showing the preferred prop support arrangement.

FIG. 16 is a side elevation suggesting the props provide a constant closing force when closed.

FIG. 26 is a plan view showing the overlying dimensions of a plurality of trucks in the standard full —size short bed model range, and the relationship of the hard cover lip to that overlying dimension.

FIG. 27 is a sectional view showing the molded platform and hard cover in a closed position along the front wall.

FIG. 28 is a sectional view of one embodiment of a side rail member.

FIG. 29 is a sectional view of another embodiment of a side rail member comprising a C channel and an adjustable tie-down hook.

FIG. 30 is a sectional view of one embodiment of a prop support showing a double sided C channel with adjustable ball studs and tie-down hook.

FIG. 31 is a perspective view of a load-bearing member that may be attached to the cover.

DETAILED DESCRIPTION OF THE PREFERRED EMBODIMENTS

Figure 1:
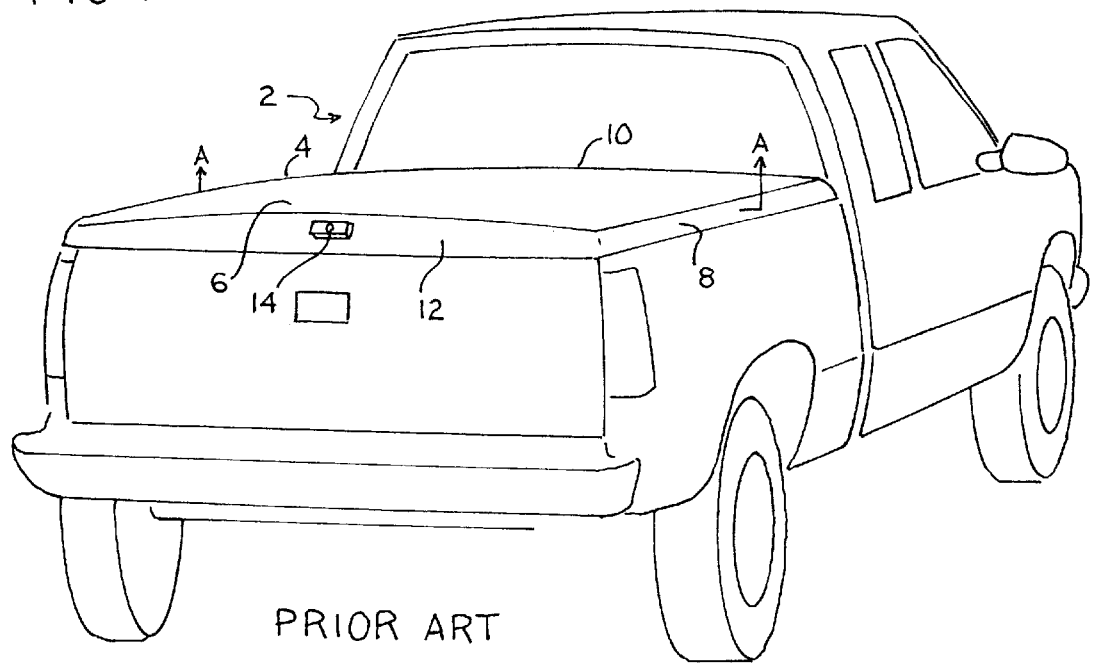
FIG. 1 is a perspective view of the prior art positioned upon a pickup truck bed.

Referring now to FIG. 1, there is seen a perspective view of pickup truck vehicle 2 showing a one piece rigid FRP cover 4 custom painted to match the color of the truck 2. The cover 4 includes a crowned top surface 6, opposed down-ward extending side walls 8, and a down-ward extending front wall 10 and rear wall 12. A T-handle lock 14 is shown affixed to the rear wall 12 of FRP cover 4. The cover 4 is representative of all FRP covers sold into the market.

Figure 2:
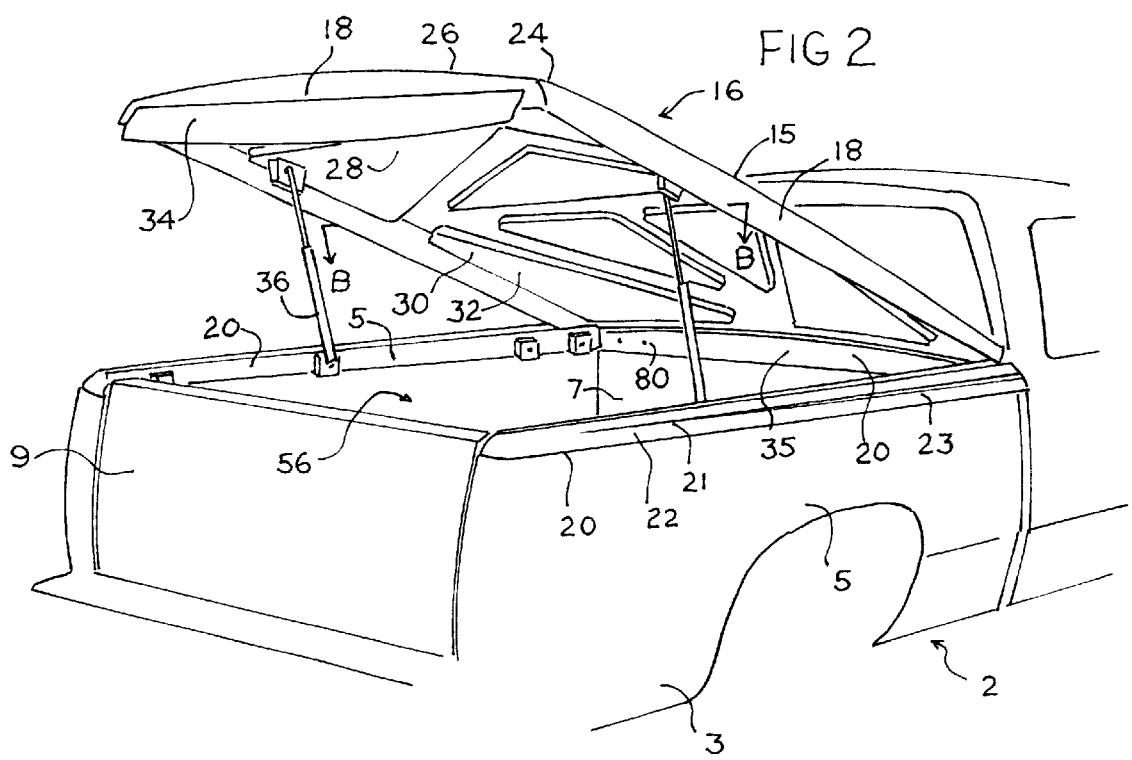
FIG. 2 is a partial perspective view of the present invention in an open position upon a truck bed.

Referring now to FIG. 2, there is seen a perspective view of one embodiment of the present invention in an open position on a truck bed 3 comprising opposed side walls 5, front wall 17 and tail gate 9. Thermoformed cover assembly 16 comprises crowned cover 15 that includes downward extending walls 18, and a molded platform 23. Molded platform 23 comprises a bed rail adapter kit 20 including opposed bed rail adapters 21 which coexist and substantially conform in detail to the truck bed rails 22, such that there is substantially no gap between the outside and inside vertical surfaces of the bed rail adapter kit 20 and the truck bed rails 22. This arrangement provides an attractive appearance as well as resistance to water penetration.

Cover 16 comprises a first thermoformed sheet of plastic 24, hereinafter referred to as top sheet 26 and second thermoformed sheet of plastic 28, hereinafter referred to as inside sheet 30. As can be seen, inside sheet 30 includes a plurality of embosses 32, which embosses 32 are adapted to impart load-bearing strength, encapsulate hardware, and provide other functional features that will be described below. Opposed side rail adapters 21, tail gate rail adapter 34 and front wall rail adapter 35 are included in rail kit 20. Also seen are opposed pneumatic props 36.

Referring now to FIG. 3, a cross section of FRP cover 4, taken along the lines A—A in FIG. 1, is seen. FRP cover 4 includes a top surface 38 comprising a painted gel-coat finish 40, a first layer of lay-up fiberglass 42, a cover reinforcing member 44, (paper honeycomb shown) and a second layer of lay-up fiberglass 46. Cover 4 also includes rail insert members 48 which are inserted between FRP layers 42 and 46 to compensate for the front to back crown of cover 4 so that the bulb gasket 50 compresses against the top 52 of the truck bed rail 54. As is illustrated to advantage, member 48, which comprises two strips of member 44 material, does not do a very good job at compensating for the crown because it is a substantially flat construction. Accordingly, water and road debris may penetrate the cargo compartment 56 through gaps existing between the truck bed rail 54 and the sidewalls 8 of cover 4 in the area taken along lines A—A.

Referring now to FIG. 4, a cross section of a thermo-formed cover 60 is shown. Cover 60 comprises top sheet 26 and inside sheet 30. Top sheet 26 and inside sheet 30 are permanently joined in a plurality of twin-sheet locations 62. Inside sheet 30 comprises a plurality of depending portions 64 that do contact the top sheet 26. Each portions 64 serves a purpose. One purpose of depending portions 64a is to provide load-bearing strength in areas of weakness 66. These include the center area 66a of the cover, which are reinforced by groupings of molded in shapes 69 that impart load-bearing strength and are off-set to prevent hinging action along lines or points of stress. More on these details later. Portions 64b (seen in FIG. 17) are also used to encapsulate hardware for hinges 80, props 86 and the like 102 as well as single and multiple point locking mechanisms 14. Portions 64c, comprising perimeter ledge 65, are provided to create a bulb gasket 68 gluing surface 51 which is substantially co-determined by the top surface 52 of bed rail 54, the diameter and durometer of gasket 50 and the weight of the cover 60. Portions 64c include gasket 68 that compress against the top surface 52 of all truck bed walls 5, 7 and 9. Portion 64d is adapted to provide strength along the front to back and side to side areas where the walls 8, 10 and 12 transition into the crowned top surface 6 of cover 60.

As can be seen in FIG. 3, gasket 50 is not in full contact or compression against the truck bed rails 54. This arrangement results in cover 4 mal alignment and potential rubbing of the walls 8, 10 and 12 against the truck bed surfaces 70. In order to overcome this potential problem, FRP cover 4 manufacturers have introduced fabricated aluminum rail kits 74. FIGS. 5 serves to illustrate this approach generally, as there are several patent pending variations of kit 74. Aluminum rail kit 74 comprises uses "C" channel 78. The "C" channel 78 is used for several purposes. Adjustable standoffs 76 are positioned in channel 78 to prevent cover 4 from compressing against the rear of the truck bed rails 54 as a result of the condition characterized in FIG. 3. Channel 78 also supports hardware to locate fixed lock keeper 80, which lock keeper holds the cover above the rail 54 to prevent abrasion caused by mal-aligned cover 4. Standoff 76 and keeper 80 are used in cooperation to retain cover 4 above bed rails 54. This arrangement does not compensate for the front to back, or side to side crown of cover 4. Therefore as FIG. 5 shows, water is still able to penetrate the cargo compartment 56 between the gasket 50 applied to the cover 4. Channel 78 is also used to hold prop bracket 88 and front hinge bracket 89.

Now referring to FIGS. 6 and 7 FIG. 6 shows the foot print 91a of FRP cover 4 in the areas where the gasket 50 compresses against the bed rail 52 to provide a water tight seal. The areas of improper or no seal are caused by the uncompensated for distance that the crown extends above the truck bed rails 54 along the margin connecting the walls 8, 10 and 12 to top surface 6. FIG. 7 shows how the perimeter ledge 65 of portion 64c of inside sheet 30 compensates for the front to back and side to side crowns to provide a predetermined space between the cover 60 and the bed rails 52. This arrangement increases the seal area to prevent water and debris penetration, while also equally distributing the load of the cover 60 upon the bed rails 52, which reduces abrasion and deformation along the hardware points associated with portions 64c. The footprint 91b of cover 60 shown in FIG. 7 corresponds to gasket 68.

Referring now to FIGS. 8, 9 and 10, a section of cover 4 is shown in FIG. 8 in the area of the front wall 7, where the FRP cover 4 is mounted to the wall 17 by hinge 79. Gasket 50 is Referring now to FIGS. 8, 9 and 10, a section of cover 4 is shown in FIG. 8 in the area of the front wall 7, where the FRP cover 4 is mounted to the wall 17 by hinge 79. Gasket 50 is provided as a seal to compress along the front wall 10. As can be appreciated in connection with FIG. 9, rail insert 48 is provided to adapt cover 4 to front wall 17 of truck bed for gasket 50 and added strength for hinge 79. Where cover front wall 10 extends up to meet crowned cover 6, rail insert 48 is raised above front rail to a position where gasket 50 does not communicate with bed rail 52. This relationship is suggested by distance X at the center and distances Z at the sidewalls 5. As shown in FIG. 10, taken at a position in the center of the cover 4, this arrangement creates a non-sealing zone that permits water and debris to enter the cargo compartment of the truck bed 56. The same condition is duplicated along the tailgate 9 of the pickup truck 2. It should be noted that cover 4 can be adapted so that piano style hinge 79 attaches to the bottom terminus 81 of front wall 10 to provide a better sealing (and hinging) condition for certain cover 4 brands.

Referring now to FIG. 11, showing thermoformed cover 60 in the same area as seen in FIG. 10, second sheet 30 includes portion 64c, which compensates for the crowned cover 6. Also seen is portion 64e extending downward in a position contiguous to front bed rail 17. Contiguous to portion 64c is channel 65, which channel 65 may be adapted to receive hinge 79 or elements thereof. Portion 64e of second sheet 30 is provided to prevent cover 60 from shifting forward when cover 60 is lifted at wall 12 so that the cover 60 can be engaged to hinges 79 from the side wall 5 of the truck bed by a first or second person. Portion 64e also operates to insure that the cover 60 is property aligned to the front wall 17 at the time of first assembly and installation of cover 60 to truck bed rails 54. (A tape with a side to side center mark may be temporarily applied to front rail 17 for this purpose.) The depth of down-ward extending portion 64e may also be interrupted by sub-portion 64ee having guiding mark 82 molded or applied to cover 60, which mark 82 may be used to align cover along center line of truck bed rails 54. This relationship is shown in FIG. 12, which is a view from inside the bed 56 looking toward the front wall 17.

Referring now to FIGS. 13 and 14, FIG. 13 shows the relationship of the pneumatic props 86 to the operation of cover 4. A first ball joint 88 is attached to the rails 54 directly, or by way of rail kit 74, as shown. A second ball joint 90 is attached to cover 4 in approximate lateral alignment with first ball joint 88. Pneumatic prop 86 is attached to ball joints 88 and 90 such that rod end 92 is attached to ball joint 88. In this arrangement, shown to better advantage is FIG. 14, prop 86 provides a constant opening force when cover 4 is closed, suggested in phantom.

As seen in FIGS. 15 and 16, another arrangement is preferred for cover 60. Inside sheet 30 includes opposed portions 64f comprising opposed prop supports 94. Prop supports 94 includes spaces 96 for prop reinforcement blocks 98 for mounting ball studs 90. Prop supports 94 preferably extend below the sidewall 8 as shown. Supports 94 may also terminate before extending beyond the margin of wall 8 for packaging purposes. This arrangement is preferred because the rod end 92 produces a constant closing pressure or downward projecting force when the cover 60 is closed. As cover 60 is closed, rod end 92 compresses to its fullest extent before reaching the closed position. As rod end 92 extends past 90 degrees or 100% compression from fixed ball stud 88, rod end 92 extends upon completely closing to produce downward pressing force. This force is preferred for thermoformed cover 60 because cover 60 has less high temperature strength than FRP cover 4, and is seen to better advantage in FIG. 16, with the props 86 shown in phantom in the closed position. The downward extending props 89 push the cover 60 into the closed position to seal cover 60 to truck bed rails 54. This arrangement also has a tendency to pull the cover 60 side walls 8 into the bed rails 54, rather away from the bed rails 54, as is the case in FIG. 14 when cover 4 is closed.

In order to optimize (reduce) the thickness of sheets 26 and 30, another arrangement for supports 94 is preferred. When the cover 60 is closed, a moment of stress is created which can cause the edge of supports 93 toward the center of gravity to deflect before the props 92 begin to compress. The support 94 can therefore be extended in front to back length to assist in deflecting the moment of stress away from the focussed area associated with the embodiment shown in FIG. 17. The desired length of long support 95 exceeds the full extend length of props 92, so that the moments of closing and opening stress are distributed over increased areas of cover 60.

Figure 17:
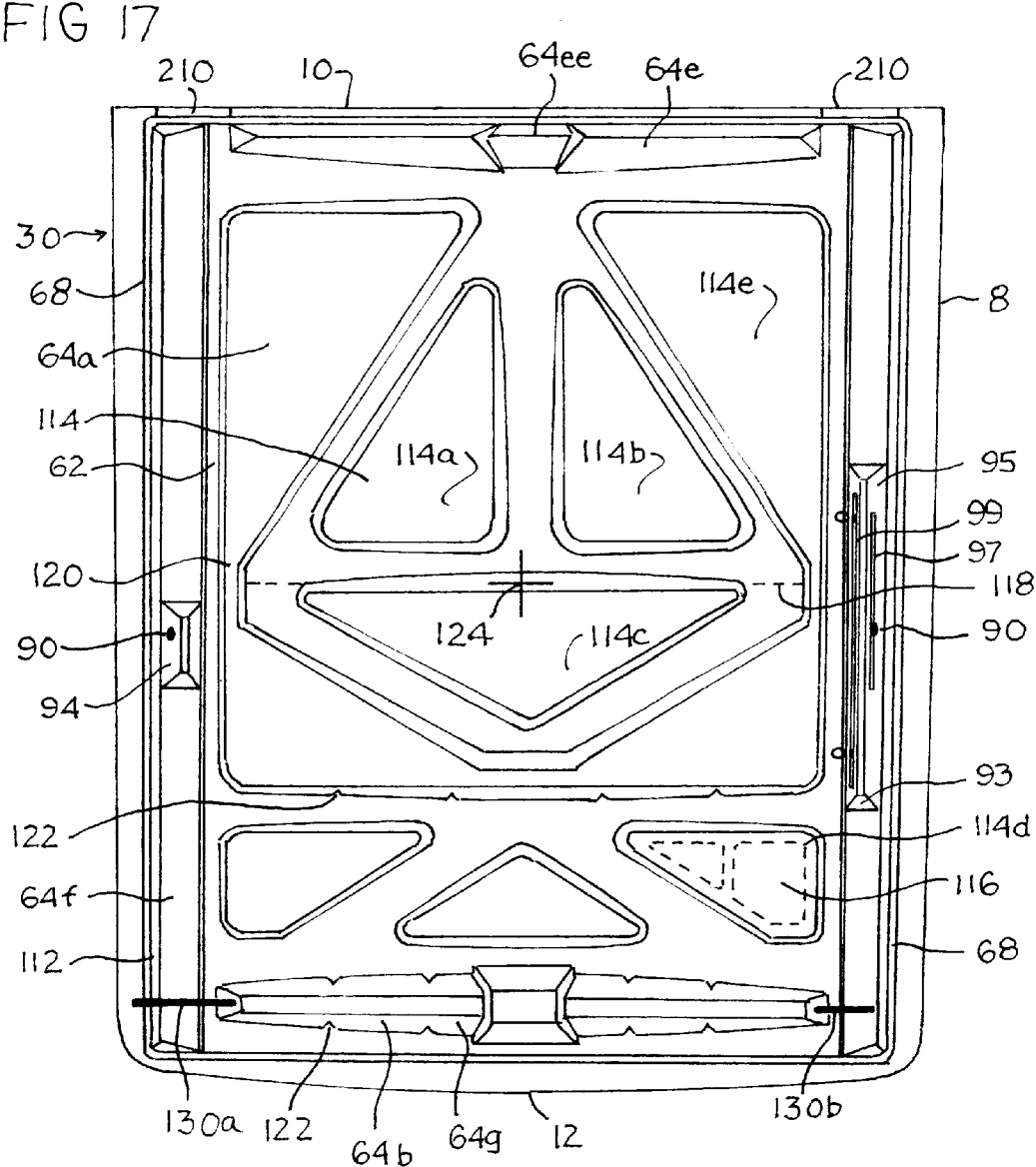
FIG. 17 is a plan view of the inside or second sheet of the present invention.

As seen best in FIG. 17, sheet 30 is molded with both embodiments of supports 94 and 95. Support 95 may be further adapted to include one or two channels 97 and 99. Channel 97 would be for the ball stud 90. The channel 99 would be for accessories and load bearing members 103. The insert 98 would be substituted for a double-sided C channel 101. The additional advantages of channel 97 include being able to shift the ball stud 90 to increase or decrease the operating strength of props 92. This arrangement compensates for the additional weight of channel 99 accessories. Such accessories would be load bearing cross member assemblies 103 adapted for carrying fishing poles, paddles, garden equipment, as well as many other types of cargo. The side rail detail 176 may be lengthened front to back to allow for ball stud 88 repositioning of prop 86 arrangement in embodiment 160 of FIG. 20.

Another arrangement preferred over that described in conjunction with FIGS. 15 and 16 is formed wire spring 100. Spring 100 comprises element 102 adapted to engage the front wall 17 of the truck bed and element 104 adapted to engage the inside sheet 30 of cover 60. Element 102 preferably resides against front wall 17 and extends to an operable position below the truck bed rails 54 so that spring 100 does not interfere with other truck bed accessories. Element 104 extends front to back along inside sheet 30 and may be encapsulated between sheets 26 and 30. Interposed between sheets 26 and 30 along the extended length of element 104 may be reinforcing elements (not shown), which elements are adapted to deflect pressure of spring 100 over wide area of cover 60. The coil 106 of spring 100 is positioned in alignment with the pivot motion of hinge 79 along the front wall 17 of bed rail 54. Other spring mechanisms may be substituted for formed wire spring 100. An advantage of this arrangement, which is shown in phantom in FIG. 16, is that it does not restrict access to the cargo area of the truck bed from the side of the vehicle. This arrangement also has the beneficial effect of the element 104 supporting the crown 6 of cover 60.

Portion 64e of inside sheet 30 is further adapted to allow cover 60 to be pre-positioned against front wall rail 54 so that spring 100 can be engaged for a no-drill application. A keeper 108 (not shown) may be used to retain the spring 100 in a position adapted for easy installation. The lock assembly 14 retains cover 60 in a closed position. Formed wire spring 100 may also be substituted with other styles of spring keeping in mind the advantages outlined above.

Also seen in FIG. 15 is portion 64d of inside sheet 30 that is provided to add strength to the cover 60. Portion 64d may comprise a single hollow section 110 running the length of the cover 60, or a plurality of hollow sections 110 running the length of cover 60. The portion 64d adds strength by creating tubular and/or bridging effects that provide lateral anti-twisting strength as well as wall 8 strength. Portion 64f may also include opposed elements 112 which align with the truck bed rail 54 to prevent the cover from shifting side to side to ease installation and to prevent vandalism to cover 60.

Referring now to FIG. 17, a plan view of inside sheet 30 is shown. Within the border defined by the gasket 68 which corresponds to the bed rails 52, it may be understood that portions 64a comprise a plurality of oblong and triangular patterns 114 that extend below the mating surfaces 62 between sheets 26 and 30. The patterns 114 provide localized strength individually as well as generally in conjunction with other patterns 114. For example, patterns 114 designated 114a, b and c are arranged to produce the configuration of a triangle which imparts load-bearing strength to sheet 30. A triangle configuration that is positioned to provide support at the center of gravity 124 of cover 60 is preferred. As indicated by pattern 114d, in phantom, the patterns 114 may also be adapted so that center portions 116 are removed to provide additional load bearing strength in the unsupported areas of patterns 114 between sheets 26 and 30. Furthermore, patterns 114 may be arranged in configuration to reduce the incidence of hinging between the lateral lines of stress created between each pattern 114. Pattern 114c is positioned so that dotted line 118 intersects with pattern 114e to prevent a hinging area. Areas between patterns 114 may also be interconnected with bridges 120 to prevent hinging. "V" grooves 122 may also be used to break up the lateral stresses that may occur when the cover 60 is subjected to resistance associated with compressing props 86 or springs 100, as well as other load producing effects.

As may also be seen in FIG. 17, inside sheet 30 may also include lock assembly housing 64g that encapsulate two-point lock assembly 126 (not seen here) comprising a center mounted t-handle 128 or the like, and opposed lock rods 130a and b, or the like. (Rod 130a is shown in the extended position, and Rod 130b is shown in the retracted position.)

Figure 18:
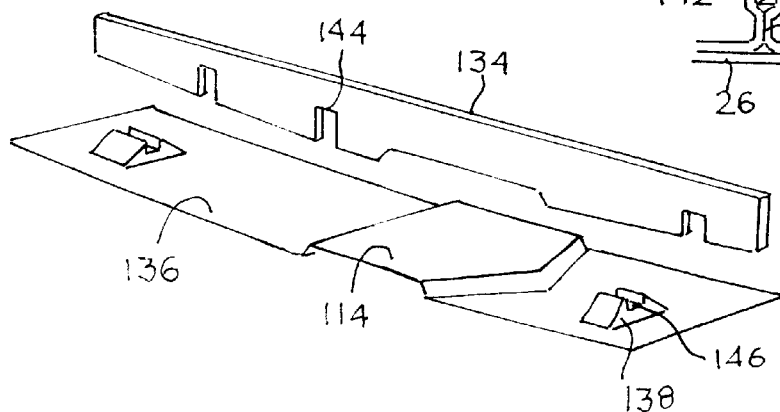
FIG. 18 is an exploded view of the mold adaptation to accept a reinforcing insert.
Figure 19:
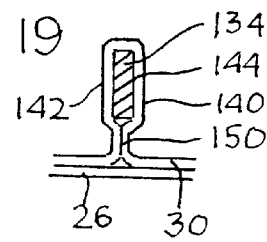
FIG. 19 is a section of the present cover reinforced with an insert.

In order to maximize the load bearing strength of cover 60 while using thinner or light weight sheets 26 and 30, it is preferred to provide strengthening inserts that can distribute the stresses that will flex the cover 60. Two such methods are contemplated. In reference to FIG. 15, a length of angle 132, or the like, may be installed in elements 112 of inside sheet 30 to provide load bearing strength as well as deflect the focused pressure points upon crown 6 associated with the operation of props 86. Alternatively, as shown in connection with FIGS. 18 and 19, reinforcing member 134 may be inserted onto blocks 138 on mold surface 136 before inside sheet 30 is thermoformed. When sheet 30 is draped over member 134 and thermoformed, elements of sheet 30 on passenger side 140 of member 134 will knit with elements of sheet 30 on driver side 142 in the notched areas 144 and along the gap 150 provided by the step 146 of blocks 138. After sheet 30 is molded over member 134, member 134 will lift away from molding surface 136 and be encapsulated within sheet 30 to impart a great deal of load bearing strength. This relationship is illustrated to advantage in FIG. 19. Member 134 is preferably constructed of the same plastic material as sheet 30 so that hot tack adhesion occurs between the sheet 30 and member 134 when sheet 30 is being thermoformed at an elevated temperature. The advantage of this arrangement is that cover 60 will remain 100% recyclable. Member(s) 136 may be adapted to run front to back and/or side to side to increase the load bearing strength of cover 60. Members 134 may also be adapted to intersect patterns 114.

Figure 20:
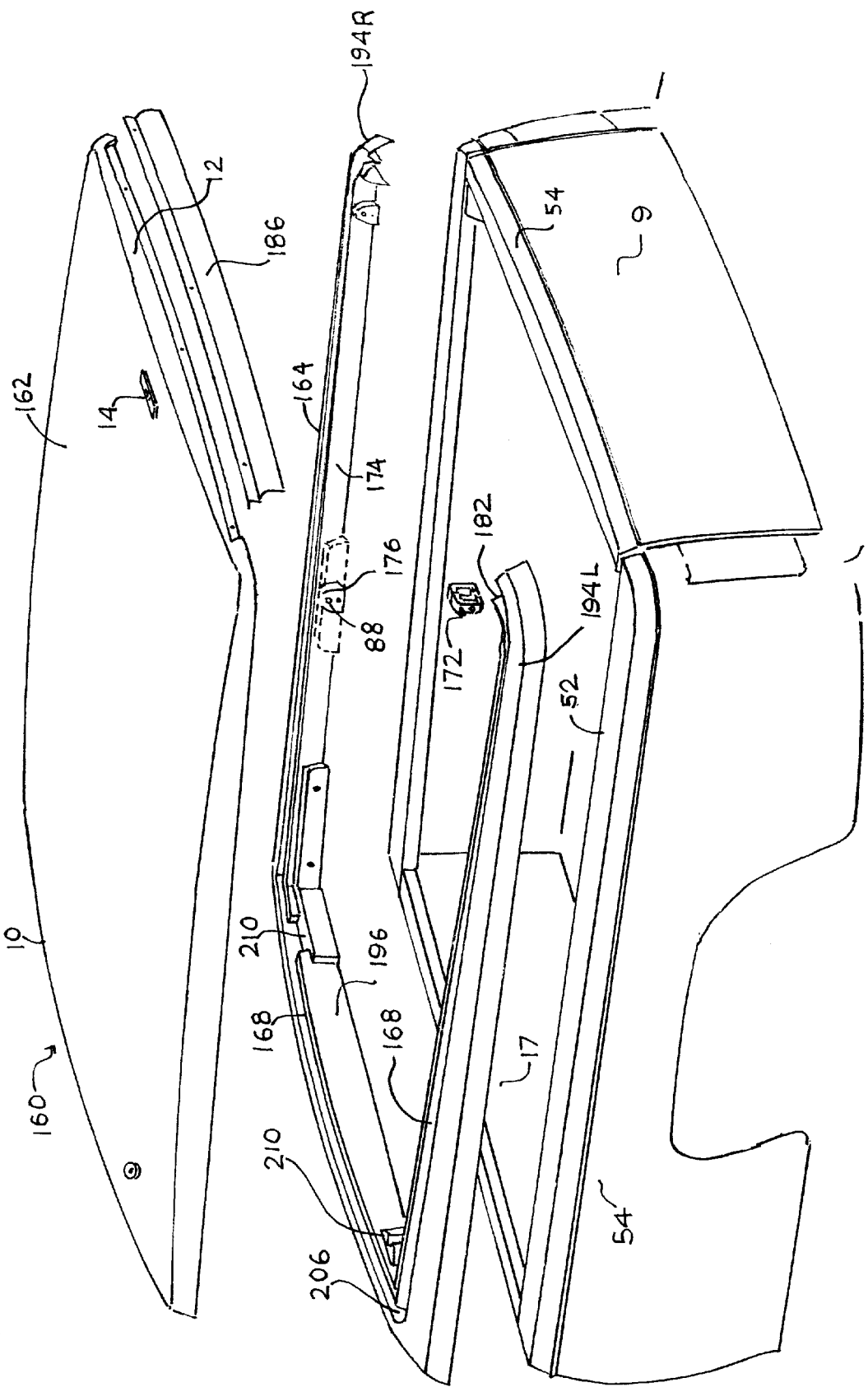
FIG. 20 is an exploded view of the present invention coupled with another present invention over the bed of a pickup truck.

It should be understood that manufacturers of FRP covers 4 have to make a dedicated mold for each truck bed model offered in the markets serviced in order to fill demand. At any point in time, this means that the manufacturer must have literally dozens of dedicated molds and several new molds under development for new model introductions. It would not be uncommon for a full-line manufacturer of FRP covers 4 to have a model selection of 50 too 100 separate and unique tonneau cover 4 models. Therefore, the need exists to develop what might be referred to as a universal product line, which line comprising 8–9 models is adaptable for all truck bed makes and models sold into the North American market. As seen in FIG. 20, cover assembly 160 is contemplated for this purpose.

Cover assembly 160 comprises thermoformed cover 162 and adapter rail kit 164. In the proposed universal product line, there would be 8–9 cover 162 models, and a larger number of rail kits 164. The cover 162 and rail kits 164 would be sold in separately packaged containers, so that distribution inventory requirements would be kept to a minimum. As may be appreciated, an inventory of 8–9 cover 162 models and the most popular selling rail kits 164 would be considerably less costly and take less inventory space than maintaining an inventory of 50 plus FRP cover 4 models. Indeed, the lower inventory requirements of the proposed cover assembly 160 would enable light truck accessory merchants that are currently outside the cover 4 market to offer the consumer cover 160 at a lower price, with faster delivery, and do-it-yourself installation. The present cover 160 would have the effect of increasing the variety and purchasing convenience for the consumer.

FIG. 26 suggests a plan view of the bed rails 54a, b and c of the top selling domestic pickup trucks with downsize truck beds. The overlapping area 166a of the plan view is suggested in the exploded sectional view of 166b. The downward extending walls 8, 10 and 12 of cover 162 are adapted to terminate within zone 167. The rail kits 164 are adapted to fit the bed rails 54 specific to each truck bed model, and include rail kit channel 168 to receive the downward extending walls 8, 10 and 12 of cover 162. The channel 168 is positioned on each rail kit 164 to receive cover 162 in the area corresponding to zone 167.

Figure 21:
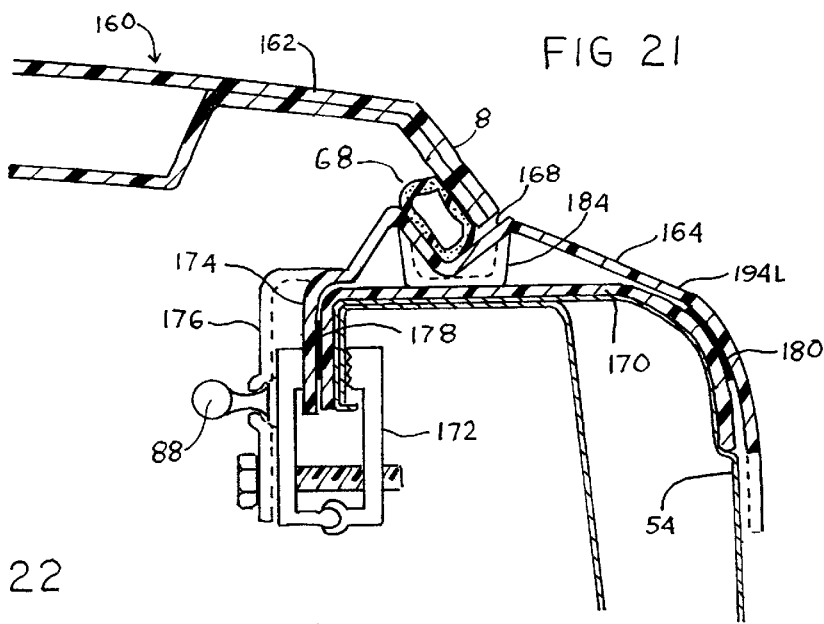
FIG. 21 is a sectional view showing the interface between the hard cover and the molded platform protecting the truck bed along the sidewalls.
Figure 22:
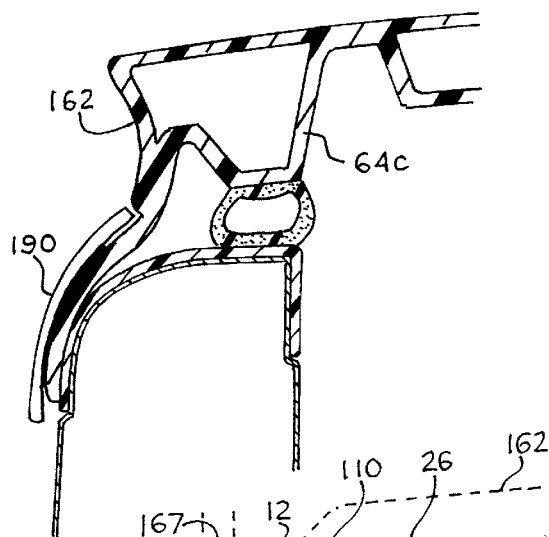
FIG. 22 is a sectional view showing one possible interface between the hard cover and the molded platform along the tailgate.
Figure 23:
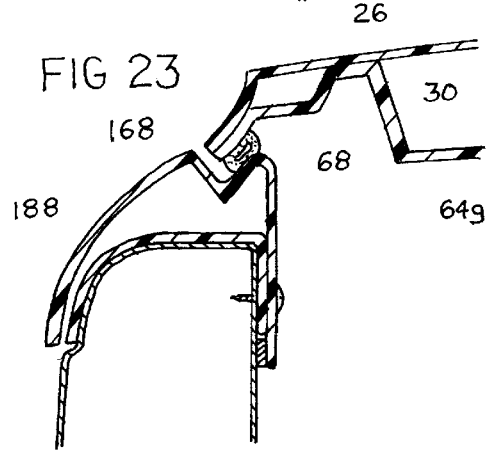
FIG. 23 is a sectional view showing an interface between the hard cover and the molded platform along the tailgate.

This arrangement is best illustrated in FIG. 21, which shows cover assembly 160 for a truck bed model that includes a factory installed plastic bed rail cover 170. The cover 162 has opposed downward extending sidewalls 8 and a gasket 68 for sealing within channel 168. Rail kits 164 are adapted to install upon bed rails 54 by a plurality of clamps 172. Where the inside downturn lip 174 corresponds to position of clamp 172, lip 174 is adapted to include projections 176 to cover clamp 172 for appearance purposes. Projections 176 may be further adapted to receive hardware for lock assembly, hinge assembly and prop assembly. Rail kits 164 may also be secured to bed rails 54 by double-sided tape 178, or prevented from abrading the paint of the bed rails 54 by single-sided tape 180. Rail kit 164 channel 168 can be developed to reside on a plane above or in contact with bed rails 54. The advantage of channel 168 residing above the bed rails 54 is prevention of abrading the paint off. The advantage of contacting the rails 54 is for added load bearing support and anti-flexing of cover assembly 160. Channel 168 may be further adapted to receive a drain opening 182 and a series of depressions 184, which depressions are adapted to extend downward from channel 168 to meet bed rails 54 as added means for achieving rail kit 164 load bearing support. The rail kit 164 may also be constructed from two sheets of molded plastic, such that inside sheet (not shown) offers the support provided by depressions 184 and the draining operation of opening 182.

Rails kits 164 may also comprise two plastic members 165 and 167. As seen in FIG. 28, rail kit element 174 (shown in phantom) of member 165 may be adapted to receive a C channel 175 for laterally adjustable tie down hooks 177 and the like. The C channel 175 is preferably encased between members 165 and 167. Clamp 172 may be adapted to engage channel 175. Other hardware may be adapted to engage channel 175 at the hinge and locking mechanisms as well.

Figure 24:
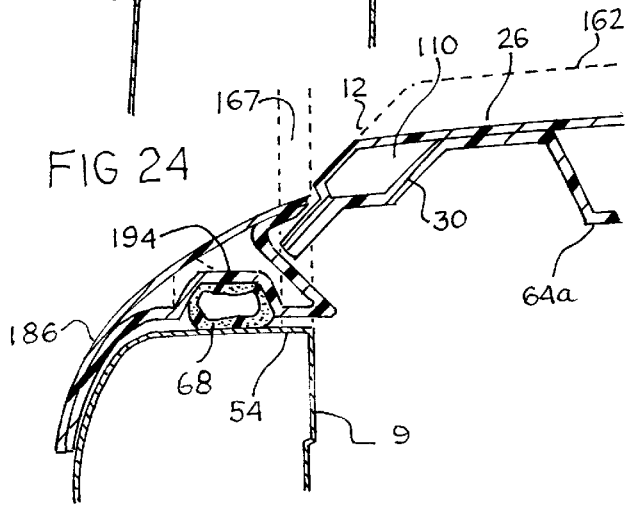
FIG. 24 is a sectional view showing one possible interface between the hard cover and the molded platform along the tailgate.
Figure 25:
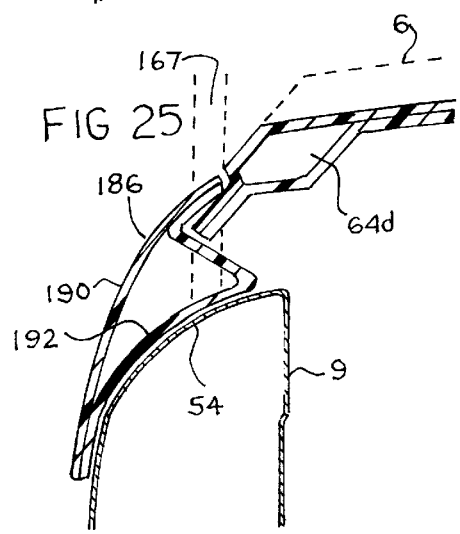
FIG. 25 is a sectional view showing one possible interface between the hard cover and the molded platform along the tailgate.

Cover assembly 160 requires further adaptation in the area of the tailgate. As seen in FIGS. 24 and 25, overlapping zone 167 at the tailgate 9 is narrow along the side to side path, such that it is advantageous to provide a tailgate rail kit member 186 that attaches to the cover 162 rather than the tailgate bed rail 54, as seen in FIG. 20. This arrangement has several advantages. First, if the member 186 is attached to the cover 162, the member 186 operates to keep the tailgate from being opened by thieves or vandals. Second, it is advantageous to provide a no-drill cover assembly 160. Tailgates are not adapted to receive clamps 172 and therefore a tailgate-mounted member 188 would have to be mechanically fastened to the tailgate. It is contemplated that member 186 would be fastened to cover 162 mechanically, by adhesives or the like, and would comprise one or more separately thermoformed parts 190 and 192 bonded together. The outside part 190 would be adapted to blend in with the contours of the side rail kit members 194R and 194L for cosmetic reasons. The inside part 192 would be adapted for mating to the cover 162 as well as providing a seal against the tailgate 54. The inside part may include depression 194 to receive gasket 68. These tailgate arrangements are seen in FIGS. 22, 23, 24 and 25.

Refering now to FIG. [27, the front wall 10 of cover assembly 160 comprises crown cover 162 and front wall rail kit member 196. The front wall 10 of cover 162 resides in front channel 169 of member 196. Member 196 includes thermoformed plastic components 198 and 200, that are glued together. Member 196 is adapted with means for hinging, means for removing the cover 162 from rail kit 164 and means for no-drill installation. Optionally, member 196 may be adapted to receive formed wire spring 100 or the like as well. Channel 169 includes a substantially horizontal surface 202, which receives compression gasket 168, a channel base surface 204 and an angled outside surface 206. Surface 206 angles a predetermined amount corresponding to the arc of swing traveled by cover 162 from the closed position to the open position. It is understood that cover assembly may be adapted in other manners to allow front wall 10 of cover 162 to travel within channel 169 for opening and closing.

The front wall hinges (not shown) of covers in preferred embodiments may also be adapted to include a lockable hinge release mechanism 208 for easy removal of covers 60 and 162 from the truck bed. Hinge mechanism 208 includes side accessibility operatable to lock the hinges in open and closed position for safety and security. The body of hinge release mechanism would be housed within portions 64 of sheet 26 and 30. The hinge area 210 of sheet 30 and corresponding rail kit member 196 may be adapted to receive releaseable hinge(s) 212 or wire spring 100.

Briefly, in accordance with this invention, there is provided a twin-sheet cover for installation onto the bed rails of a pickup truck. The cover, including hardware may be operable with the truck bed alone, or in cooperation with rail adapting kits. It is to be understood that the drawings and descriptive matter are in all cases to be interpreted as merely illustrative of principles, methods and apparatus of the invention, rather than as limiting the same in any way, since it is contemplated that various changes may be made in various elements to achieve like results without departing from the spirit of the invention or the scope of the appended claims.

What is claimed is:

1. A rigid cover assembly for an open bed of a pickup truck, the rigid cover comprising:

A first sheet of heat deformable plastic having a slightly crowned surface and four depending walls defining a perimeter lip;

A second sheet of heat deformable plastic having a slightly crowned surface and four depending walls defining a perimeter lip;

Whereupon the slightly crowned surface and depending walls of the second sheet are included depending structures, which depending structures comprise:
a perimeter ledge supporting a gasket interfacing with a top surface margin of the open bed of said pickup truck,
a plurality of depending ribs arrayed to rigidify said slightly crowned surface, and
opposed prop supports that depend below a margin defined by the perimeter lip;

Wherein portions of the slightly crowned surfaces and the four depending walls of said first and second sheets achieve interfacial contact when deformed to produce said rigid cover.

2. A rigid cover assembly as in claim 1, wherein ball studs associated the opposed prop supports depend downward from said rigid cover to a distance below fixed ball studs supported upon an inside margin of the open bed, the arrangement creating a constant downward closing force when said rigid cover is closed, thus preventing said heat deformable plastic comprising said rigid cover from deflecting away from the top surface margin of the open bed of said pickup truck.

3. A rigid cover assembly as in claim 1, wherein the depending structures of the second sheet include a depending front retaining wall which said depending front retaining wall prevents the rigid cover from advancing forward from an operable condition.

4. A rigid cover assembly as in claim 1, wherein the depending structures of said second sheet include a lock assembly housing, said lock assembly housing shielding a lock assembly from exposure to disruptive influences.

5. A rigid cover assembly for open beds of a plurality of pickup truck vehicles, wherein the open beds are defined by an outside wall, an upper bed surface and an inside wall, the rigid cover comprising:

A twin sheet construction of heat deformable plastic, wherein a top sheet and a bottom sheet of said heat deformable plastic are fused together to form the rigid cover having a downward extending front wall, back wall and opposed side walls, the four walls defining a perimeter lip selectively arranged to substantially reside within a pluralistic margin defined by a narrowest and a widest bed surface margin of said plurality of said pickup truck vehicles;

Such that the front wall of said rigid cover is wider than the back wall of said rigid cover, and the opposed side walls of said rigid cover become narrower from the rigid cover front wall to the rigid cover back wall in accordance with the pluralistic margin of said upper bed surface of said plurality of pickup truck vehicles.

6. A rigid cover assembly as in claim 5, wherein the second sheet is interrupted about a perimeter margin where said second sheet transitions from a center portion defined by a slightly crowned surface with an array of depending ribs to said depending four walls to provide a hollow section strengthening and maintaining said perimeter lip in a fixed position.

7. A rigid cover assembly as in claim 5, wherein said second sheet overlays a reinforcement insert member during deformation of said sheet over a thermoforming mold to support said first and second sheets a fixed distance apart.

8. A rigid cover assembly for an open bed of a pickup truck vehicle, the rigid cover assembly comprising:

A rigid cover comprising an overlaying first surface and four depending walls selectively fused to portions of an underlying second surface and four depending walls, wherein the second surface is interrupted by depending rib structures; and A molded platform, comprising a front wall member and opposed side wall members. which molded platform installs upon an upper margin of the open bed, the molded platform engaging said rigid cover for operable use upon said pickup truck vehicle, such that said rigid cover does not directly interface with said open bed.

9. A rigid cover assembly as in claim 8, wherein said front wall and opposed side wall members of the molded platform include an open channel that receives the four depending walls of the rigid cover.

10. A rigid cover assembly as in claim 8, wherein a hinge element upon said second sheet adjacent a front rigid cover wall interfaces with a hinge element upon said molded platform to hingedly engage said rigid cover to said molded platform.

11. A rigid cover assembly as in claim 8, wherein a two-point lock assembly residing between said first and second sheets interfaces with locking means upon said opposed side wall members to lock said rigid cover to said molded platform.

12. A rigid cover assembly as in claim 8, wherein opposed prop support structures depending from said second sheet and opposed Drop support means of said opposed side wall members engage opposed gas props to support said rigid cover in an open position upon said molded platform.

13. A rigid cover assembly as in claim 8, wherein opposed prop support structures depending from said second sheet and opposed prop support means of said opposed side wall members engage opposed gas props to support said rigid cover in a closed position upon said molded platform.

14. A rigid cover assembly as in claim 8, wherein the molded platform includes a tailgate member, said tail gate member attaching to said rigid cover.

15. A rigid cover assembly as in claim 8, wherein end margins of the opposed side wall members overlap opposed end margins of the front member adjacent a front wall of the truck bed to cover the front wall and opposed side walls of the open bed of said pickup truck vehicle.

16. A rigid cover assembly for a truck bed having an open interior bordered by four rails, the rigid cover comprising:

A first sheet of plastic providing an exterior surface having a slightly crowned central body covering the open interior and four depending walls overlapping the four rails; and Fused to portions of an interior surface of the first sheet a second sheet of plastic, said second sheet of plastic including an array of depending ribs adjacent the slightly crowned central body forming rigidifying hollow sections, and a stepped perimeter adjacent a border area intermediate the slightly crowned central body and four depending walls, said stepped perimeter forming a rigidifying hollow margin maintaining the four depending walls a fixed distance apart and supporting a gasket compressible upon the four rails of the truck bed.

17. A rigid cover assembly as in claim 16 wherein the stepped perimeter of the second sheet forming the rigidifying hollow margin comprises a vertical section and a horizontal section, the vertical section extending downward from the slightly crowned central body to the horizontal section, which horizontal section is positioned a fixed distance above the four rails so that the gasket is the only aspect of the rigid cover communicating with the four rails of the truck bed.

18. A rigid cover assembly as in claim 16 wherein the second sheet of plastic includes a retaining wall adjacent a front bed rail in a position intermediate the array of depending ribs and the stepped perimeter, said retaining wall extending downward to a point below the front bed rail preventing the rigid cover from shifting forward upon the truck bed.

19. A rigid cover assembly as in claim 16 wherein the second sheet of plastic includes a lock assembly housing adjacent a tail gate rail in a position intermediate the array of depending ribs and the stepped perimeter, said lock assembly housing extending downward into the open interior to shield a lock assembly from shifting cargo carried within the truck bed.

20. A rigid cover assembly as in claim 16, wherein a coil spring is provided, the coil spring having a first extended end cooperating with a front wall of the truck bed and a second extended end cooperating with the interior surface of the rigid cover, the coil spring providing a lifting action upon the rigid cover when opposed lock members supported upon said rigid cover adjacent a tail gate of the truck bed are disengaged from opposed lock member receiving ends supported upon opposed side walls of said truck bed.

21. A rigid cover assembly for an open bed of a pickup truck, the rigid cover comprising:

A first sheet of heat deformable plastic;

The first sheet having a slightly crowned surface and four depending walls defining an exterior perimeter lip;

A second sheet of heat deformable plastic;

The second sheet includes a slightly crowned central body portion having an array of depending ribs arranged to rigidify and maintain the slightly crowned central body portion of the second sheet in a fixed position adjacent the first sheet, four depending walls defining an interior perimeter lip, and a hollow portion formed at a margin where the slightly crowned central body portion transitions into said four depending walls defining said interior perimeter lip, the hollow portion being provided to rigidify and maintain the four depending walls defining interior perimeter lip in a fixed position; and Wherein said first and second sheets of heat deformable plastic achieve interfacial communication there between where said slightly crown central body portion and said four depending walls of said second sheet are not interrupted by said array of depending ribs and said hollow portion.

22. A rigid cover as in claim 21, wherein a horizontal section of the hollow portion of said second sheet supports a compression gasket, the compression gasket arranged and configured to communicate with top surfaces of a front rail, opposed side rails and a tailgate of the open bed of the pickup truck to provide a water tight seal.

23. A rigid cover assembly for an open bed of a pickup truck, the rigid cover comprising:

A first sheet of plastic having a slightly crowned convex exterior surface and four depending walls defining a exterior perimeter lip;

A second sheet of plastic having:

A slightly dished concave exterior surface defining a central body portion, wherein the central body portion is interrupted by a plurality of structures depending therefrom, said structures comprising depending rib elements arranged to maintain said slightly dished concave exterior surface in a fixed position adjacent the slightly crowned convex exterior surface when under a load; and Four depending walls and intermediate said four depending walls and said slightly dished concave exterior surface a hollow section there between, said hollow section arranged to strengthen and maintain said four depending walls in a fixed position adjacent the exterior perimeter lip when under a load.

24. A method providing a constant closing force upon a rigid cover of heat deformable plastic in a closed position upon a truck bed comprising a front inside bed rail, opposed inside bed rails and a tailgate, the method comprising:

Providing two gas props including a pressurized tube having a fixed stud receiving end, a thrusting rod received by said pressurized tube having a moving stud receiving end, a compressed length and an extended length;

Providing the rigid cover of heat deformable plastic with opposed prop supports positioned adjacent the opposed inside bed rails, the opposed prop supports depending downward to a point extending below a lower margin defined by the opposed inside bed rails;

Affixing one moving ball stud upon each of the opposed prop supports on a side adjacent the opposed bed rails, such that the moving ball studs upon the opposed prop supports are resting below the lower margin defined by the opposed inside bed rails when the rigid cover is in a closed position;

Affixing one fixed ball stud upon each of the opposed inside bed rails in a position intermediate the front inside bed rail and the moving ball stud, said position for the fixed ball studs being determined as a horizontal distance equal to or slightly greater than the compressed length of a one of said two gas props as said moving ball stud traverses adjacent the opposed inside bed rails; and Attaching the fixed stud receiving ends of the gas props to the fixed ball studs and the moving stud receiving ends of the gas props to the moving ball studs, such that when the rigid cover is partially closed the moving stud receiving ends compress to a point where the fixed ball studs and the moving ball studs are aligned parallel adjacent the opposed inside bed rails and such that when the rigid cover is completely closed the moving stud receiving ends extend down to a point where the moving ball studs reside below the fixed ball studs adjacent the opposed inside bed rails, the arrangement providing a constant extending force closing the rigid cover upon the truck bed.

25. The method of claim 24 wherein the opposed prop supports include a rigid channel member adjustably receiving the moving ball studs, the rigid channel member allowing the moving ball studs to be laterally positioned thereupon allowing for a greater or a lesser rigid cover open height upon the truck bed.

26. A plurality of standard pickup truck model sizes having open beds, characterized in that the open beds are bordered by front rails, opposed side rails and tail gates that are substantially similar in over-all front-to-back length and side-to-side width, are covered by a one standard model size rigid cover, the one standard model size rigid cover comprising:

A top sheet of plastic providing an exterior surface having a slightly crowned central body covering open beds and four depending walls residing within a top margin defined by a juxtaposed plurality of front rails, opposed side rails and tailgates associated with the open beds of the plurality of standard pickup truck model sizes;

Fused to portions of an interior surface of the top sheet of plastic a bottom sheet of plastic substantially the same size and having the same over-all dimension of the top sheet of plastic, whereupon the bottom sheet of plastic there is included an array of depending ribs underlying the slightly crowned central body, said depending ribs forming hollow sections rigidifying the slightly crowned central body thereby maintaining a desired shape of the exterior surface of the top sheet;

Fused to portions of the interior surface of the top sheet of plastic in a bend region where the slightly crowned central body transitions into the four depending walls are additional elements of the bottom sheet of plastic, said additional elements include a stepped perimeter comprising four depending wall sections, which wall sections are fused to the four depending walls of the top sheet of plastic providing a double walled perimeter lip, and horizontal sections and vertical sections, which horizontal sections and vertical sections combine at a joining margin to define a hollow structure adjacent the bend region, which hollow structure braces said double walled perimeter lip and maintains a desired shape in the bend region of the top sheet of plastic;

Said double walled perimeter lip characterized in that it includes a front wall adjacent front rails, opposed side walls adjacent opposed side rails and a rear wall adjacent tail gates, said double walled perimeter lip is contiguous the slightly crowned central body; and A slightly crowned central body portion adjacent the front wall wider than a slightly crowned central body portion adjacent the rear wall, and slightly crowned central body portions adjacent the opposed side walls narrowing from the front wall to the rear wall, such that only the front wall and the rear wall are parallel.

27. A system to attach a rigid cover over a front rail and opposed side rails of an open bed of a pickup truck, the system comprising:

a rail kit assembly including a front rail member and opposed side rail members, wherein said front rail member and opposed side rail members interface at end margins adjacent the front rail, said rail kit assembly overlapping said front rail and opposed side rails of the open bed of the pickup truck;

a rigid cover including a central body portion, a front depending wall, opposed side depending walls and a rear depending wall;

said front rail member and said opposed side rail members of the rail kit assembly including a channel, said channel positioned and configured to receive said front depending wall and opposed side depending walls of said rigid cover; and wherein at least said opposed side rail members of said rail kit assembly are removably attached by fastening means to said opposed side rails of the open bed to attach said rigid cover over the open bed of a pickup truck.

28. A system as in claim 27, wherein a hinge element associated with the front rail member of said rail kit assembly cooperates with a hinge element associated with the rigid cover adjacent the front depending wall, said hinge elements allowing the rigid cover to be moved between open and closed positions upon the rail kit assembly over the open bed of the pickup truck.

29. A system as in claim 27, wherein said rigid cover is removably disengagable from said rail kit assembly to provide a partially open pickup truck bed for the transportation of cargo.

30. A system as in claim 27, wherein the channel of said rail kit assembly is open at least at one end thereof to allow rainwater to exist said channel.

31. A system as in claim 27, wherein the rail kit assembly overlaps the front rail and the opposed side rails of the open bed of the pickup truck to protect painted metal surfaces thereof.

32. A system as in claim 27, wherein an inside vertical surface of the opposed side rail members include a rigid channel member having means to receive a plurality of adjustable tie down hooks for securing cargo within the open bed.

33. A system as in claim 27, wherein an interior surface of the central body portion includes opposed depending prop support structures that extend below the opposed side rails members, said opposed depending prop support structures and said opposed side rail members including studs receiving a pair of pneumatic cylinder props, said pneumatic cylinder props provided maintaining said rigid cover in a closed position and lifting said rigid cover to an open position relative the rail kit assembly over the open bed of the pickup truck.

34. A system as in claim 27, wherein an interior surface of the central body portion of the rigid cover include rigid channel means receiving opposed accessory hold down cross members supporting elongated light-weight cargo upon the interior surface of said rigid cover.

35. A system as in claim 27, wherein a coil spring is provided, the coil spring having a first extended end cooperating with the front wall of the open bed and a second extended end cooperating with a lower surface of the rigid cover, the coil spring providing a lifting action upon the rigid cover when opposed lock members supported upon said rigid cover adjacent a tail gate of the open bed are disengaged from opposed lock member receiving ends supported upon the opposed side rail members.

36. A system as in claim 27, wherein there is provided the following:

a plurality of rail kits assemblies, each one of said plurality of rail kit assemblies being configured and adapted to cover a specific make and model of pickup truck, said plurality of rail kit assemblies each include a channel; and a single rigid cover, the perimeter lip of said single rigid cover configured and adapted to be received within the channel of each of said plurality of rail kit assemblies.

* * * * *